United States Patent
Murphy et al.

(10) Patent No.: US 10,533,498 B2
(45) Date of Patent: Jan. 14, 2020

(54) GAS TURBINE ENGINE ASSEMBLY METHOD AND SYSTEM

(71) Applicant: United Technologies Corporation, Farmington, CT (US)

(72) Inventors: Gabrielle Murphy, West Hartford, CT (US); Gregory E. Reinhardt, South Glastonbury, CT (US); Robert M. Lewis, Berlin, CT (US); Scott L. Peterson, Longmeadow, MA (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/889,259

(22) Filed: Feb. 6, 2018

(65) Prior Publication Data
US 2018/0156125 A1    Jun. 7, 2018

Related U.S. Application Data

(62) Division of application No. 14/737,671, filed on Jun. 12, 2015, now Pat. No. 9,885,286.

(Continued)

(51) Int. Cl.
*F02C 7/20* (2006.01)
*B66C 11/12* (2006.01)
(Continued)

(52) U.S. Cl.
CPC ............... *F02C 7/20* (2013.01); *B66C 11/04* (2013.01); *B66C 11/12* (2013.01); *F01D 25/285* (2013.01);
(Continued)

(58) Field of Classification Search
CPC . F02C 7/20; B66C 11/04; B66C 11/12; F01D 25/285; F05D 2230/68; Y10T 29/49236
See application file for complete search history.

(56) References Cited

U.S. PATENT DOCUMENTS 2,825,477 A    3/1958 Ross
3,268,093 A    8/1966 Keiter
(Continued)

FOREIGN PATENT DOCUMENTS

EP    1752409 A2    2/2007
GB    2306155 A    4/1997

OTHER PUBLICATIONS

European Search Report for EP Application No. 15172035.6 dated Nov. 4, 2015.

(Continued)

*Primary Examiner* — John C Hong
(74) *Attorney, Agent, or Firm* — Carlson, Gaskey & Olds, P.C.

(57) ABSTRACT

An assembly system for assembling a gas turbine engine including a support beam defining a horizontal plane for assembly of engine components along a horizontal axis substantially parallel with the support beam. A forward arm is supported on the support beam for supporting a forward portion of an engine component. An aft arm is supported on the support beam for supporting an aft portion of the engine component. An aft mounting ring is attachable to an aft end of an engine assembly. A forward mounting ring is attachable to a forward end of the engine assembly. A drive is mounted to the aft arm engageable to the aft mounting ring for rotating the engine assembly about the horizontal axis. A roller is supported on the forward arm and engageable to the forward mounting ring to support the first end of the engine assembly during rotation about the horizontal axis. A method is also disclosed.

7 Claims, 12 Drawing Sheets

Related U.S. Application Data

(60) Provisional application No. 62/011,894, filed on Jun. 13, 2014.

(51) Int. Cl.
*B66C 11/04* (2006.01)
*F01D 25/28* (2006.01)

(52) U.S. Cl.
CPC ..... *F05D 2230/68* (2013.01); *Y10T 29/49236* (2015.01)

(56) References Cited

U.S. PATENT DOCUMENTS

| | | | |
|---|---|---|---|
| 5,816,367 | A | 10/1998 | Lilja et al. |
| 6,170,141 | B1 | 1/2001 | Rossway et al. |
| 6,546,616 | B2 | 4/2003 | Radowick |
| 7,103,952 | B2 | 9/2006 | Appleton et al. |
| 7,568,575 | B2 | 8/2009 | Kalantari |
| 7,735,363 | B2 | 6/2010 | Mainville |
| 7,861,579 | B2 | 1/2011 | Mainville |
| 8,220,769 | B2 | 7/2012 | Mainville et al. |
| 8,336,846 | B2 | 12/2012 | Fernley et al. |
| 8,590,151 | B2 | 11/2013 | Brown et al. |
| 2009/0266275 | A1* | 10/2009 | Feeney ............... B65D 19/44 108/55.1 |
| 2012/0279064 | A1 | 11/2012 | Reinhardt et al. |
| 2015/0316197 | A1 | 11/2015 | Morey et al. |

OTHER PUBLICATIONS

Search Report and Written Opinion for Singapore Application No. 10201504689W dated Nov. 15, 2017.

* cited by examiner

GAS TURBINE ENGINE ASSEMBLY METHOD AND SYSTEM

CROSS REFERENCE TO RELATED APPLICATION

This application is a divisional of U.S. application Ser. No. 14/737,671 filed on Jun. 12, 2015, which claims priority to U.S. Provisional Application No. 62/011,894 filed on Jun. 13, 2014.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine includes several components that are housed in casings that are assembled together through bolted flanges. In some systems, the gas turbine engine is assembled along a vertical axis and can complicate access to structures about the engine. Moreover, during engine assembly not only are specific components assembled to each other along a common axis, but accessory components and devices are attached to outer casing structures. Engine assembly requires assembling specific case structures together and assembly of accessory components to the case structures. Each accessory component may require wiring for electrical communication and tubing to communicate fluids. The quantity of wires and tubing required for each accessory component can complicate the assembly process.

Accordingly, it is desirable to design a system for assembling an engine that provides repeatability while easing access to each component and section to speed and simplify assembly.

SUMMARY

In one exemplary embodiment, an assembly system for assembling a gas turbine engine including a support beam defining a horizontal plane for assembly of engine components along a horizontal axis substantially parallel with the support beam. A forward arm is supported on the support beam for supporting a forward portion of an engine component. An aft arm is supported on the support beam for supporting an aft portion of the engine component. An aft mounting ring is attachable to an aft end of an engine assembly. A forward mounting ring is attachable to a forward end of the engine assembly. A drive is mounted to the aft arm engageable to the aft mounting ring for rotating the engine assembly about the horizontal axis. A roller is supported on the forward arm and engageable to the forward mounting ring to support the first end of the engine assembly during rotation about the horizontal axis.

In a further embodiment of the above, includes at least one additional arm disposed between the forward arm and the aft arm for supporting a portion of the engine assembly.

In a further embodiment of any of the above, the at least one additional arm includes a first arm and a second arm movable vertically relative to the support beam.

In a further embodiment of any of the above, includes an end assembly supported on one of the at least one additional arm. The end assembly includes a lateral adjustment linkage for aligning an engine component secured thereto in a direction transverse to the horizontal axis.

In a further embodiment of any of the above, the end assembly includes first and second clamps set apart from each other on opposite sides of an engine centerline.

In a further embodiment of any of the above, includes a first mount secured to the engine assembly and engageable with the first arm and a second mount secured to the engine assembly and engageable with second arm.

In a further embodiment of any of the above, each of the forward arm and the aft arm are supported on a sliding support movable along the support beam.

In a further embodiment of any of the above, the aft arm and the forward arm are each movable between a stowed position and a mount position.

In a further embodiment of any of the above, includes a motor corresponding with each of the forward arm and the aft arm for driving a linkage to move the corresponding one of the forward arm and the aft arm between the stowed position and the mount position.

In a further embodiment of any of the above, the aft arm is movable about a pivot between the stowed and mount positions.

In a further embodiment of any of the above, the forward arm is movable vertically to adjust spacing between the support beam and the roller.

In a further embodiment of any of the above, the aft mounting ring includes locking features engageable to the drive mounted on the aft arm.

In a further embodiment of any of the above, the forward mounting ring includes a groove receiving a roller of the roller assembly for supporting the forward portion of the engine assembly.

In a further embodiment of any of the above, includes at least one cart for supporting an engine component relative to the horizontal axis that enables positioning of the supported engine component in at least two directions.

In another exemplary embodiment, a method of assembling a gas turbine engine includes attaching an aft mounting ring to an aft portion of an aft engine section, attaching a forward mounting ring to a forward portion of a forward engine section, supporting a first intermediate engine section along a horizontal axis, attaching the aft engine section to the intermediate engine component, supporting a portion of the aft engine section along a horizontal axis with a drive supported on an aft arm by attaching the aft mounting ring to the drive, supporting a portion of the forward engine section along the horizontal axis with a roller assembly supported on a forward arm by coupling the roller assembly to the forward mounting ring, rotating the aft, first intermediate and forward engine sections about the horizontal access with the drive supported on the aft arm, and performing assemble operations on the aft, first intermediate, and forward engine sections.

In a further embodiment of the above, the drive includes a motor driving a gear assembly and the aft mounting ring includes gear teeth engaged by the gear assembly for driving rotation of the aft engine section about the horizontal axis.

In a further embodiment of any of the above, the forward mounting ring includes a track for receiving rollers of the roller assembly and supporting the forward engine section includes inserting the rollers into the track of the forward mounting ring.

In a further embodiment of any of the above, supporting the first intermediate engine section along the horizontal axis includes fixing a first arm to a first mount attached to the first intermediate engine and a second arm to a second mount attached to the first intermediate engine section.

In a further embodiment of any of the above, includes detaching the first arm and the second arm from the corresponding first mount and second mount prior to rotating the aft, first intermediate, and forward engine sections about the horizontal axis.

In a further embodiment of any of the above, includes aligning the aft engine section along the horizontal axis with a cart, wherein the cart enables positioning of the aft engine section in at least two axes.

The embodiments, examples and alternatives of the preceding paragraphs, the claims, and the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
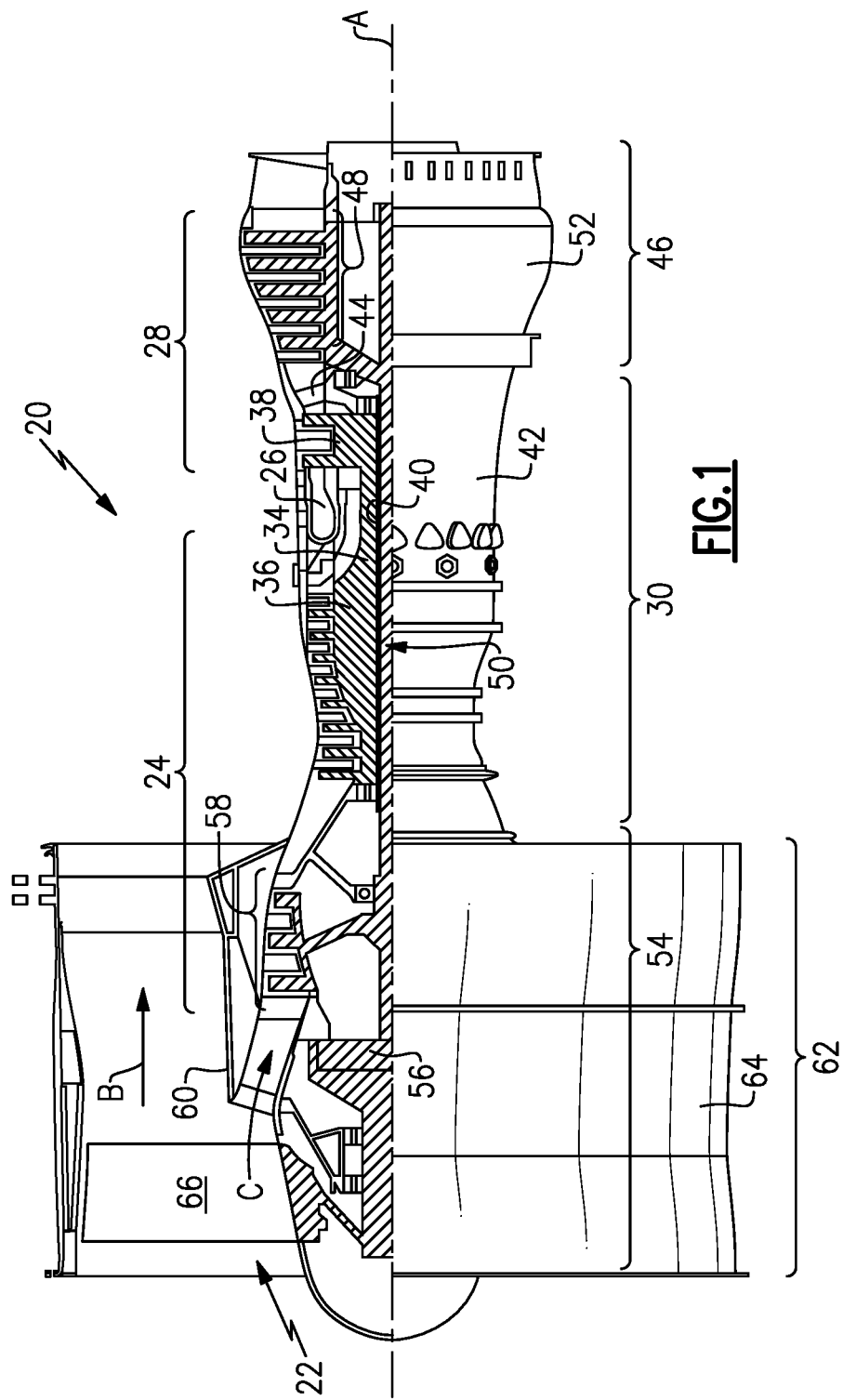
FIG. 1 is a schematic illustration of an example gas turbine engine.

FIG. 1 schematically illustrates an example gas turbine engine 20 that includes a fan 22, a compressor 24, a combustor 26 and a turbine 28. Alternative engines might include an augmenter section (not shown) among other systems or features. The fan 22 drives air along a bypass flow path B while the compressor 24 draws air in along a core flow path C where air is compressed and communicated to a combustor 26. In the combustor 26, air is mixed with fuel and ignited to generate a high pressure exhaust gas stream that expands through the turbine 28 where energy is extracted and utilized to drive the fan 22 and the compressor 24.

The example gas turbine engine 20 includes several sections that are attached to each other during assembly. In this example, the gas turbine engine 20 includes a core engine section 30, a low pressure turbine section 46, a fan drive/compressor (FDC) section 54 and a fan section 62. The core engine section 30 includes combustor 26, a high spool 34 and a mid-turbine frame 44. The high spool 34 includes a high pressure compressor 36 coupled to a high pressure turbine 38 through high spool shaft 40. The components of the core engine section 30 are mounted within several cases that are secured to each other and are referred to in this disclosure as an intermediate case 42.

The low pressure turbine section 46 includes low pressure turbine 48 and the low spool shaft 50 supported within a low pressure turbine case 52. The FDC section 54 includes the low pressure compressor 58 and fan drive gear system 56 supported within a FDC case 60. The fan 22 is housed within a fan case of the fan section 62. The fan 22 includes a plurality of blades 66 supported for rotation about the engine axis A. Each of the sections 30, 46, 54 and 62 are disposed about the engine axis A.

It should be appreciated, that components of each of the disclosed sections 30, 46, 54 and 62 are described by way of example and different and/or additional components could be included in the various sections. Moreover, although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Figure 2:
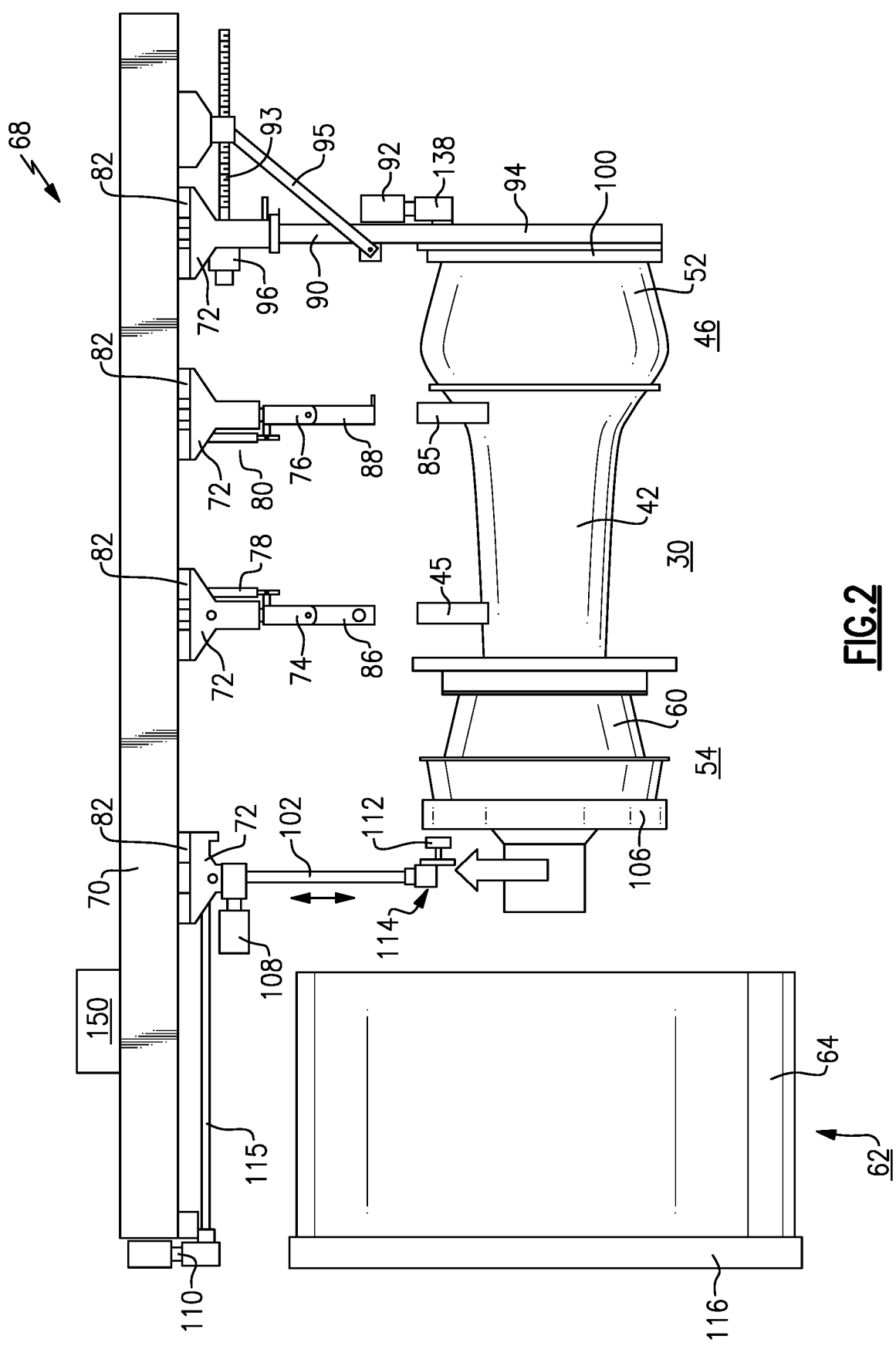
FIG. 2 is a schematic illustration of an example assembly system for assembling a gas turbine engine.

Referring to FIG. 2, an example assembly system 68 provides for the horizontal assembly and disassembly of engine sections 30, 46, 54 and 62. Horizontal assembly enables each of the sections 30, 46, 54 and 62 to be supported and assembled along a horizontal axis such that each section and component about the entire circumference of the engine 20 is easily accessible to a technician during assembly.

The example system 68 includes sliding supports 72 extending from a beam 70. Each of the supports 72 is movable horizontally along the beam 70 and includes a lock 82 for holding the support in place along the beam 70. Each of the supports 72 holds an arm that includes features for attachment to the engine sections. In this example a first arm 74 includes an end 86 attachable to a forward mount 45 attached to the core engine section 30. A second arm 76 includes an end assembly 88 for attachment to an aft mount 85 attached to the core engine section 30. The supports 72 are movable horizontally along the beam 70 prior to attachment to an engine section. The supports 72 lock in place to prevent horizontal movement.

A third or aft arm 90 is movable between a stowed position (FIG. 3) and a mounting position shown in FIG. 2. The third arm 90 supports a motor 92 that drives a gear assembly 138. A fourth or forward arm 102 includes a roller assembly 114. A controller 150 is in communication with sensors and load cells mounted throughout the system 68 to provide information indicative of the position of components during assembly and the loads on each part of the system 68. This information is utilized to execute safety protocols and proper alignments.

The example system 68 includes features enabling complete 360 degree rotation of subassemblies of the engine about the horizontal axis A. The horizontal axis A and the engine axis in this disclosed example are the same. Continuous 360 degree rotation about the axis A aids and simplifies assembly and eases access to portions of the engine sections to facilitate assembly of the engine. Rotation is enabled by mount rings 106 and 116 for a forward part of an engine subassembly and the gear assembly 138 and mount ring 100 at the aft end. The mount ring 100 attaches to a geared ring 94 that is driven by the gear assembly 138 driven by the motor 92. The motor 92 drives rotation of the engine during assembly and the roller assembly 114 supports and enables rotation of the forward part of the engine subassembly. In various stages of assembly the roller assembly 114 will be engaged to the mount ring 106 or the fan case mount ring 100.

Figure 3:
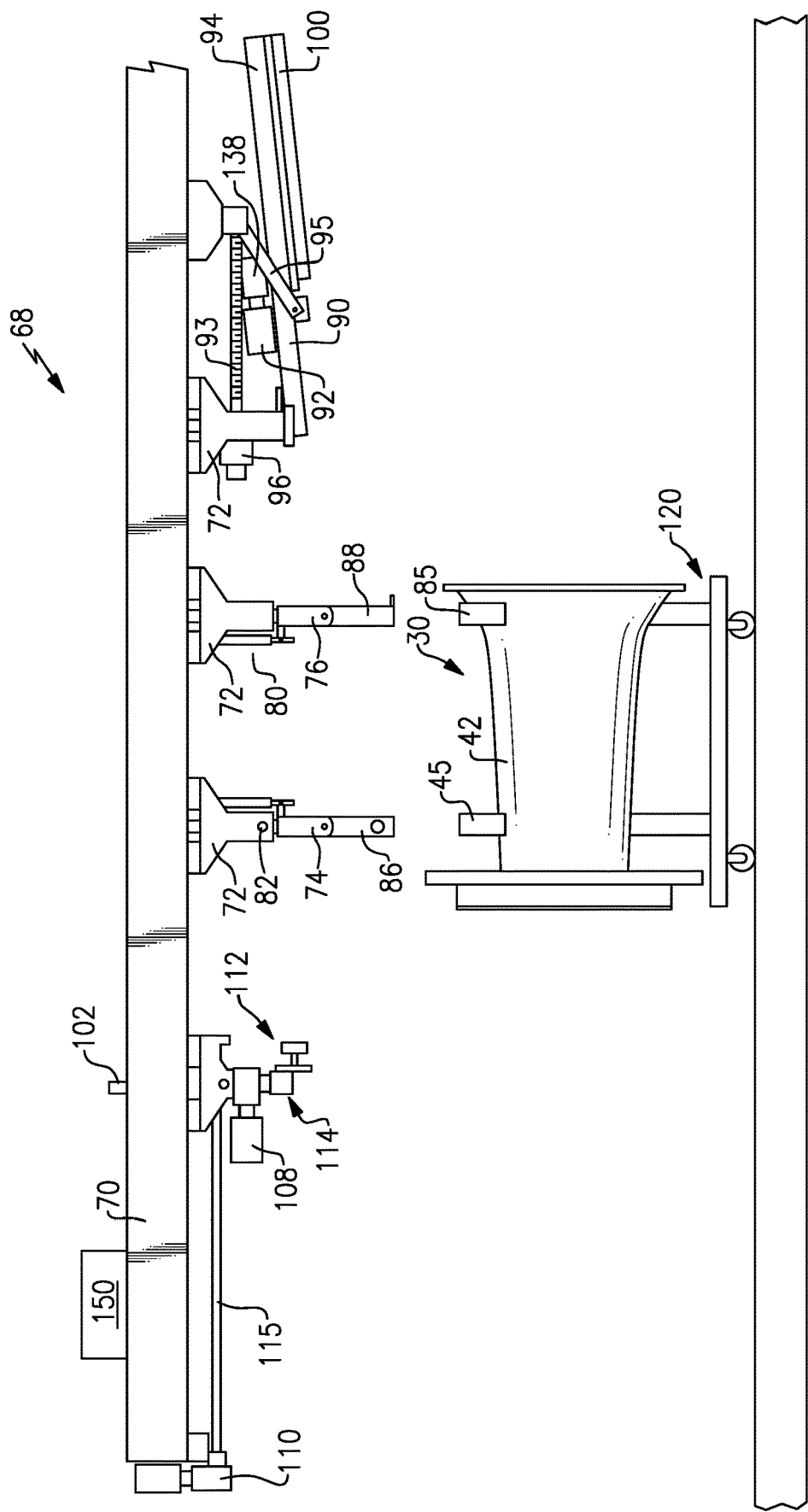
FIG. 3 is a schematic view of an initial step for assembling a gas turbine engine.
Figure 4:
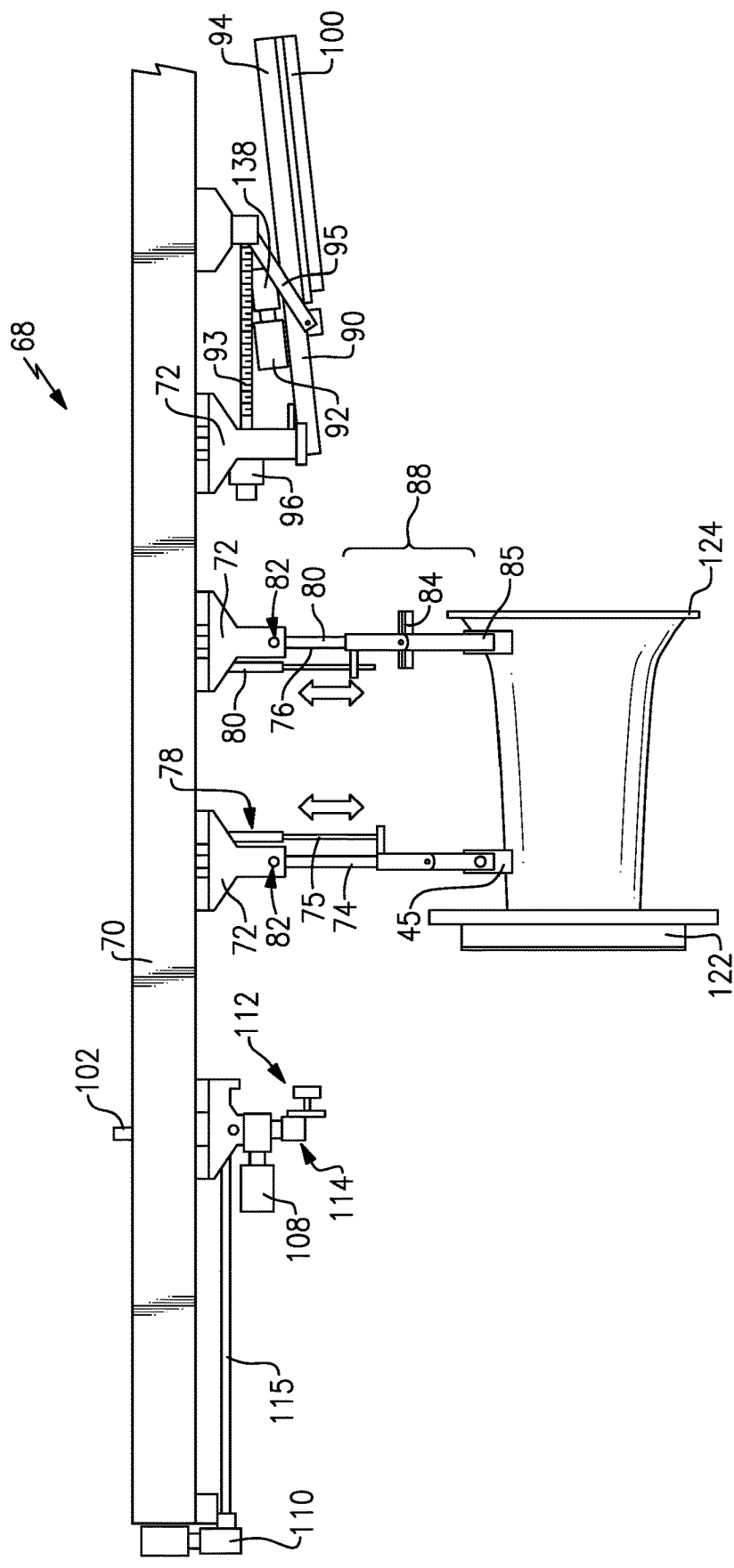
FIG. 4 is a further schematic illustration of the first assembly step.

Referring to FIGS. 3 and 4, assembly begins by moving the core engine section 30 into position under the first arm 74 and the second arm 76. The core engine section 30 is supported on a first cart 120 that enables movement of the core engine section 30 along all axes for aligning the core engine section 30 with the first and second arms 74, 76.

The core engine section 30 includes a forward flange 122 and a rear flange 124. Once the core engine section 30 is in position, the first arm 74 is moved downward by a jack screw shaft 75 (FIG. 4) driven by an electric motor 78. The forward mount 45 and aft mount 85 are attached to the case 42 and are adapted to the configuration of the core case 42. Each of the forward mount 45 and aft mount 85 includes features for attachment to the corresponding one of the first arm 74 and the second arm 76. The first arm 74 attaches to the forward mount 45 and the second arm 76 attaches to the aft mount 85. Attachment between the first and second arms 74, 76 and the forward and aft mounts 45, 85 are fixed and do not enable rotation about the horizontal axis.

Figure 5:
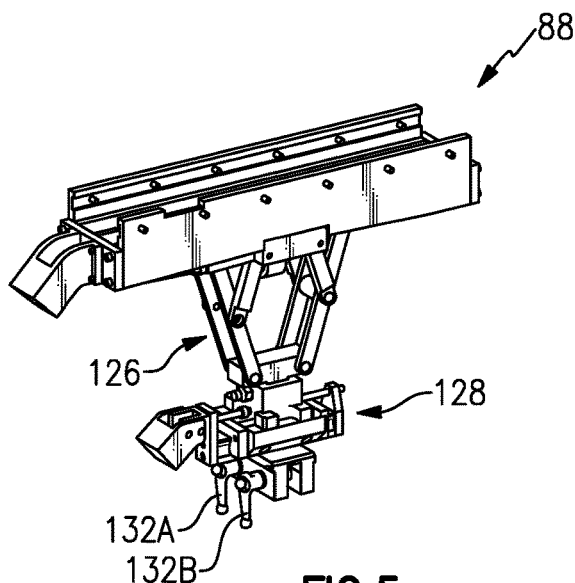
FIG. 5 is a perspective view of an example end assembly for supporting a subassembly of a gas turbine engine.

Referring to FIG. 5 with continued reference to FIG. 4, the second arm 76 is moved downward toward the core engine section 30 with the gas spring 80 compensating for the weight of the second arm 76 to enable manual adjustment. Further movement of the arm 76 is enabled to provide fine alignment with the engine section. The gas spring 80 relieves weight on the scissor mechanism 126 and controls movement by slowing momentum. The attachment mechanism 126 holds a vertical position of the arm 76 once it is attached to the core engine section 30, and the core engine section 30 is set at a desired height. It should be understood, that other mechanisms for moving the attachment mechanism 88 into place relative to the core engine section 30 are within the contemplation of this disclosure.

The attachment mechanism 88 further includes a lateral slide 128 that includes first and second lock pins 132A and 132B disposed on either circumferential side of a centerline of the engine core section 30. The lock pins 132A and 132 B engage the engine mounts 45 and 85 to support the core engine section 30. The lateral slide 128 centralizes the load and provides for lateral adjustment of the core engine section 30 once suspended from the beam 70. It should be understood that other configurations for interfacing with the engine mounts 45 and 85 are within the contemplation of this disclosure.

Figure 6:
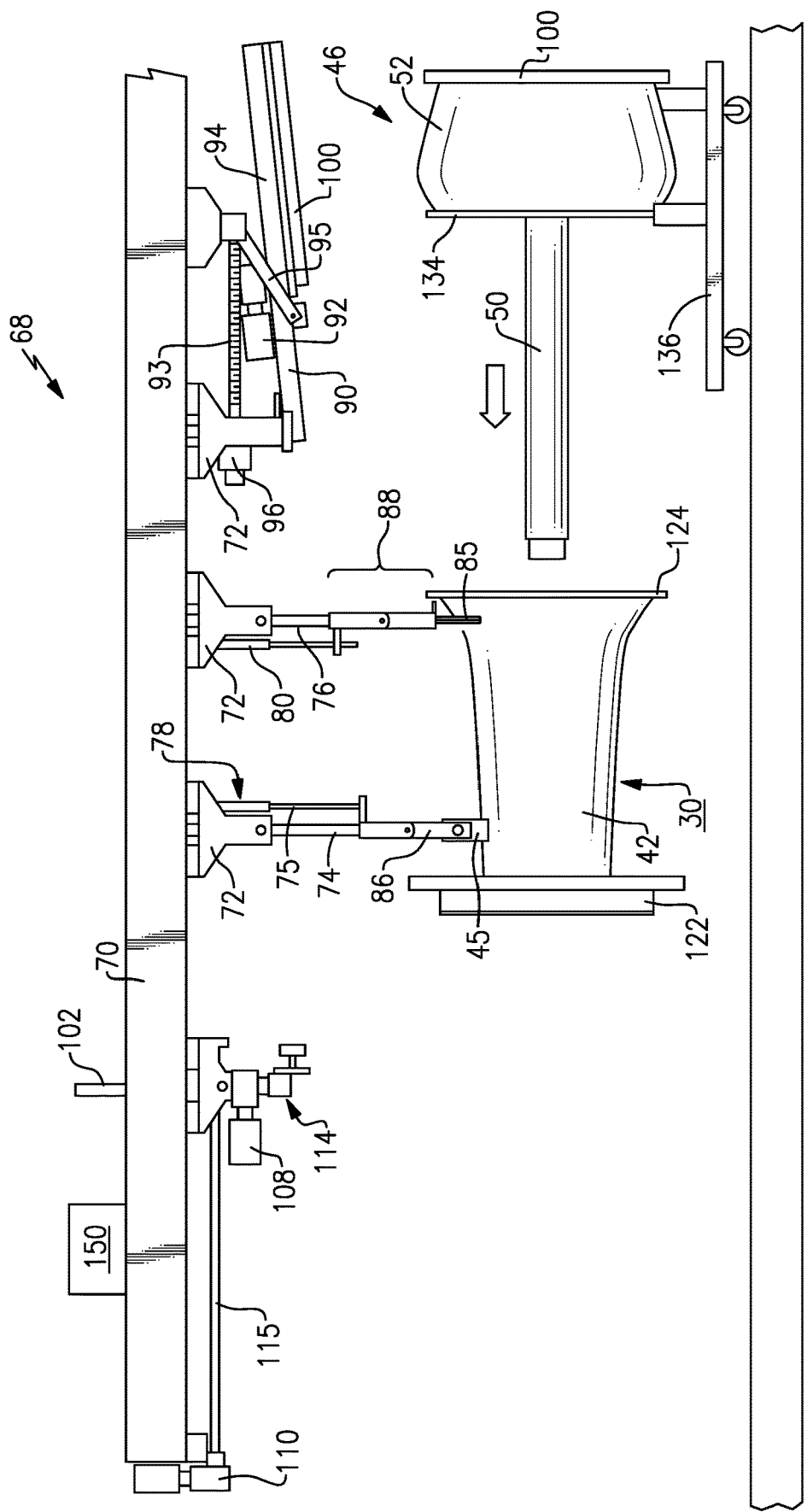
FIG. 6 is a schematic illustration of a subsequent step for installing a low pressure turbine section.
Figure 7:
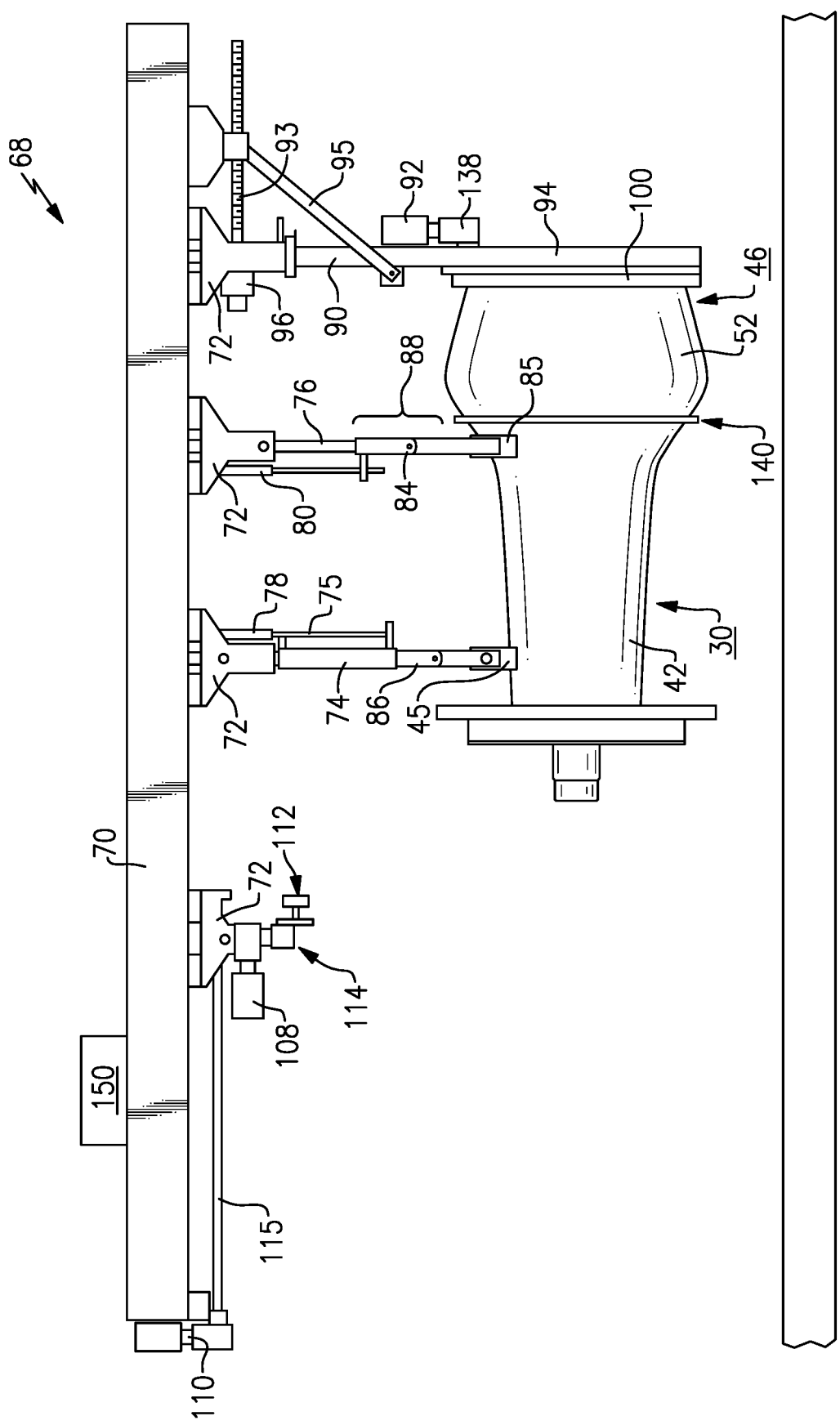
FIG. 7 is a schematic illustration of a subassembly of a gas turbine engine supported by the example assembly system.

Referring to FIGS. 6 and 7, the low pressure turbine (LPT) section 46 is then moved along the horizontal axis for assembly to the core engine section 30. The LPT section 46 is supported on a second cart 136 that provides movement of the LPT section 46 along all axes to enable alignment along the horizontal axis with the core engine section 30. The core engine section 30 is supported on the first and second arms 74, 76 suspended from the upper support beam 70 and the LPT section 46 is supported on the cart 136 during assembly. Each of the arms 74, 76 is movable vertically to aid in alignment with the LPT section 46. In this example, the LPT section 46 includes the shaft 50 that extends along the horizontal axis and is assembled through the core engine section 30.

Once the LPT section 46 is aligned with the core engine section 30 and the shaft 50 is inserted therethrough, the sections 46 and 30 are attached to each other. Attachment in this example includes attachment of the rear flange 124 of the core engine section 30 to a forward flange 134 of the LPT section 46. The shaft 50 extends out a forward end of the core engine section 30. The aft flange 124 and the forward flange 134 form a connection 140 (FIG. 7) between the core engine section 30 and the LPT section 46.

Figure 8:
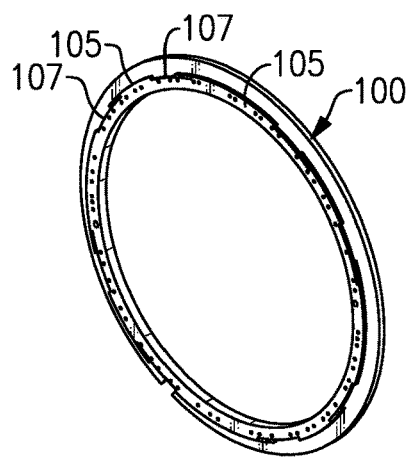
FIG. 8 is a perspective view of an example fan case mount ring.

Once the connection 140 is complete, the aft portion of the LPT section 46 is mounted to the aft arm 90. The aft arm 90 is pivoted to the mount position by actuation of a motor 96 that drives jack screw 93 to drive link 95 and move arm 90 into position. The arm 90 includes a geared ring 94 that attaches to the mount ring 100 secured to the LPT section 46. The fan case mount ring 100 (FIG. 8) is an adaptor that is not part of the completed engine and is utilized to facilitate assembly on the arm 90. The fan case mount ring 100 includes a slots 107 that provide for mating engagement of an aft portion of the engine to other assembly or test systems.

Referring back to FIGS. 6 and 7, the arm 90 is pivoted downward to the mount position by the electric motor 96 that drives the jack screw 93 to drive link 95 such that the geared ring 94 engages the mount 100 ring. An electric motor 92 is supported on the arm 90 and drives the gear assembly 138 in driving engagement with the geared ring 94. The electric motor 92 includes a sensor that provides information indicative of a rotational positon of the assembly to the controller 150. The gear assembly 138 enables rotation of the engine subassembly about the engine axis A.

However, in the state illustrated in FIG. 7, it should be appreciated that although the LPT section 46 is mounted for rotation, the subassembly is not yet rotatable because the first and second arms 74, 76 are attached to fixed points on the core engine section 30. The motor 92 is therefore locked from rotation until a further rotational support link is provided.

Figure 11:
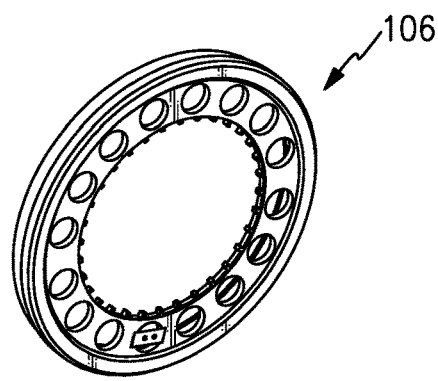
FIG. 11 is a perspective view of an example mount ring attachable to provide and support rotation about a horizontal axis.
Figure 9:
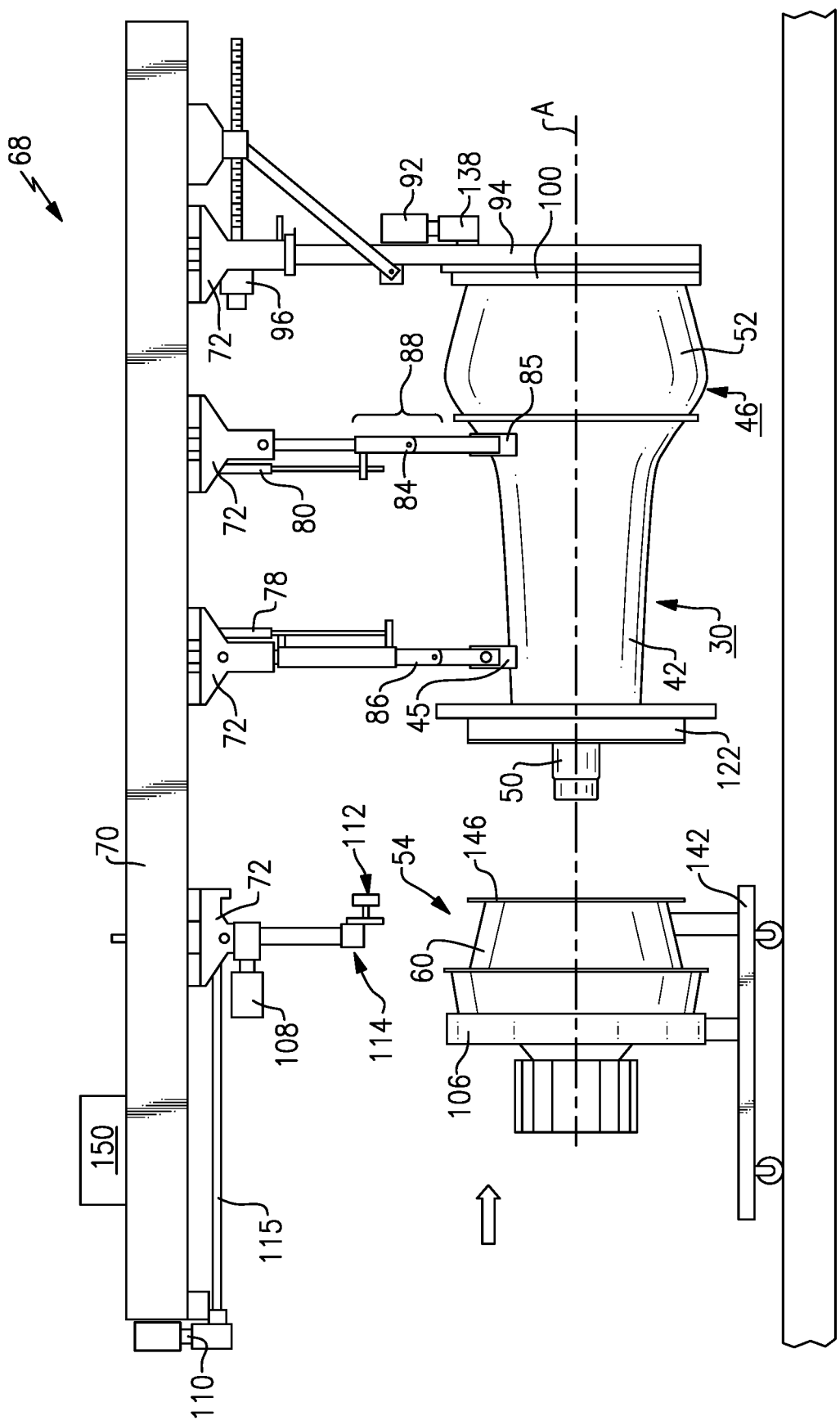
FIG. 9 is a schematic illustration of an assembly step for assembling a fan compressor section.

Referring to FIG. 9 once the LPT section 46 is attached to the core section 30, the FDC section 54 is installed. A mounting ring 106 (FIG. 11) is attached to the FDC section 54 for engagement with a roller assembly 114 (FIG. 13) to support rotation of the front portion of the engine subassembly. The mounting ring 106 is engageable with the roller assembly 114 that facilitates rotational movement.

The FDC section 54 is supported on a third cart 142 that also provides for movement in all axes to facilitate alignment with the core section 30, and the shaft 50 of the LPT section 46. In this step, the FDC section 54 is aligned with the core engine section 30 and the shaft 50. An aft flange 146 of the FDC section is attached to the forward flange 122 of the core engine section 30. The shaft 50 is coupled to the fan drive gear system 56 (not shown here) disposed within the FDC case 60.

Figure 12:
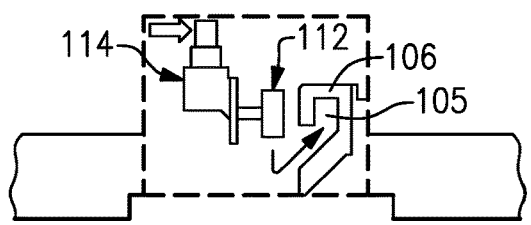
FIG. 12 is an enlarged view of a roller assembly and mount ring.
Figure 10:
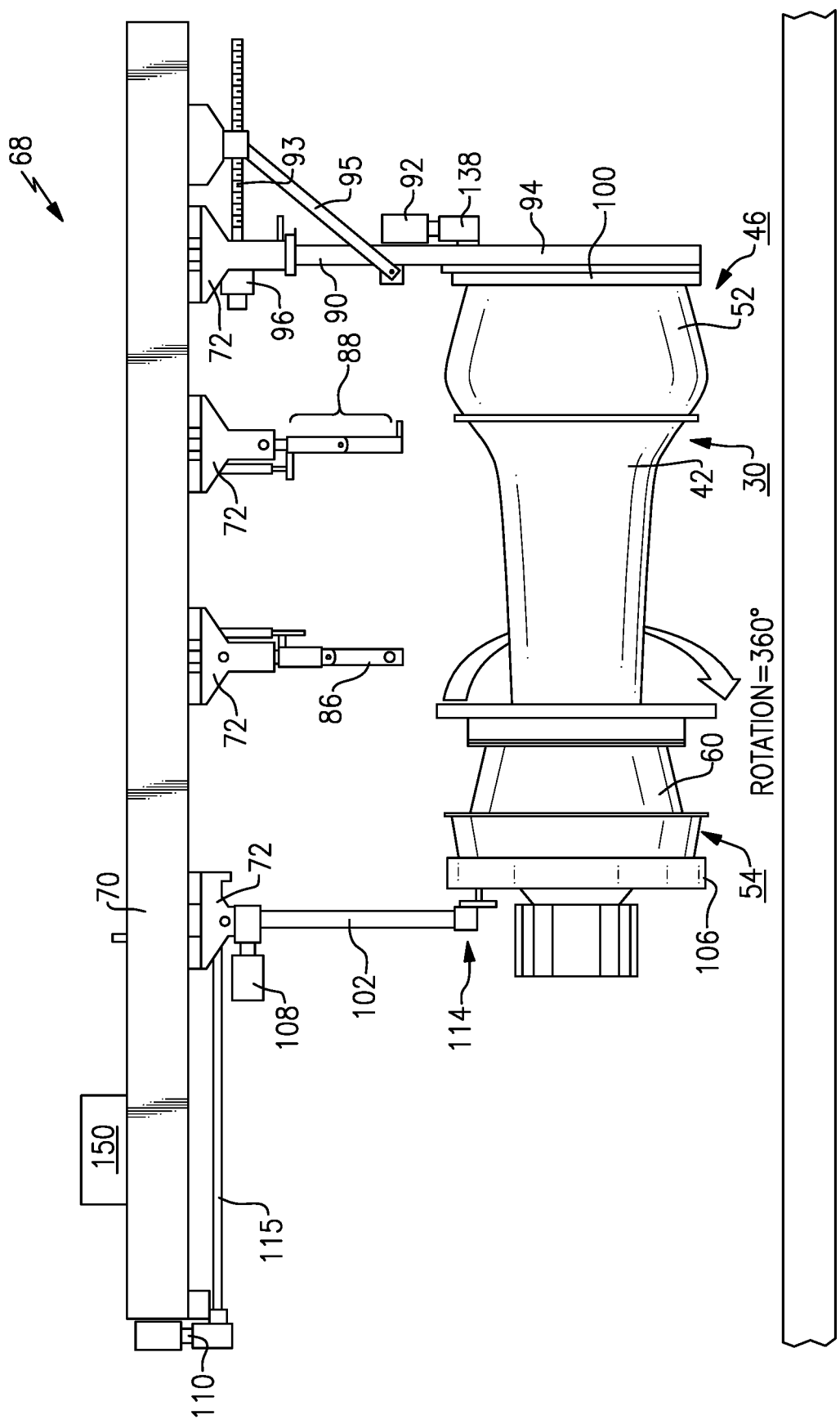
FIG. 10 is another schematic illustration showing an engine subassembly supporting forward and aft positions.
Figure 14:
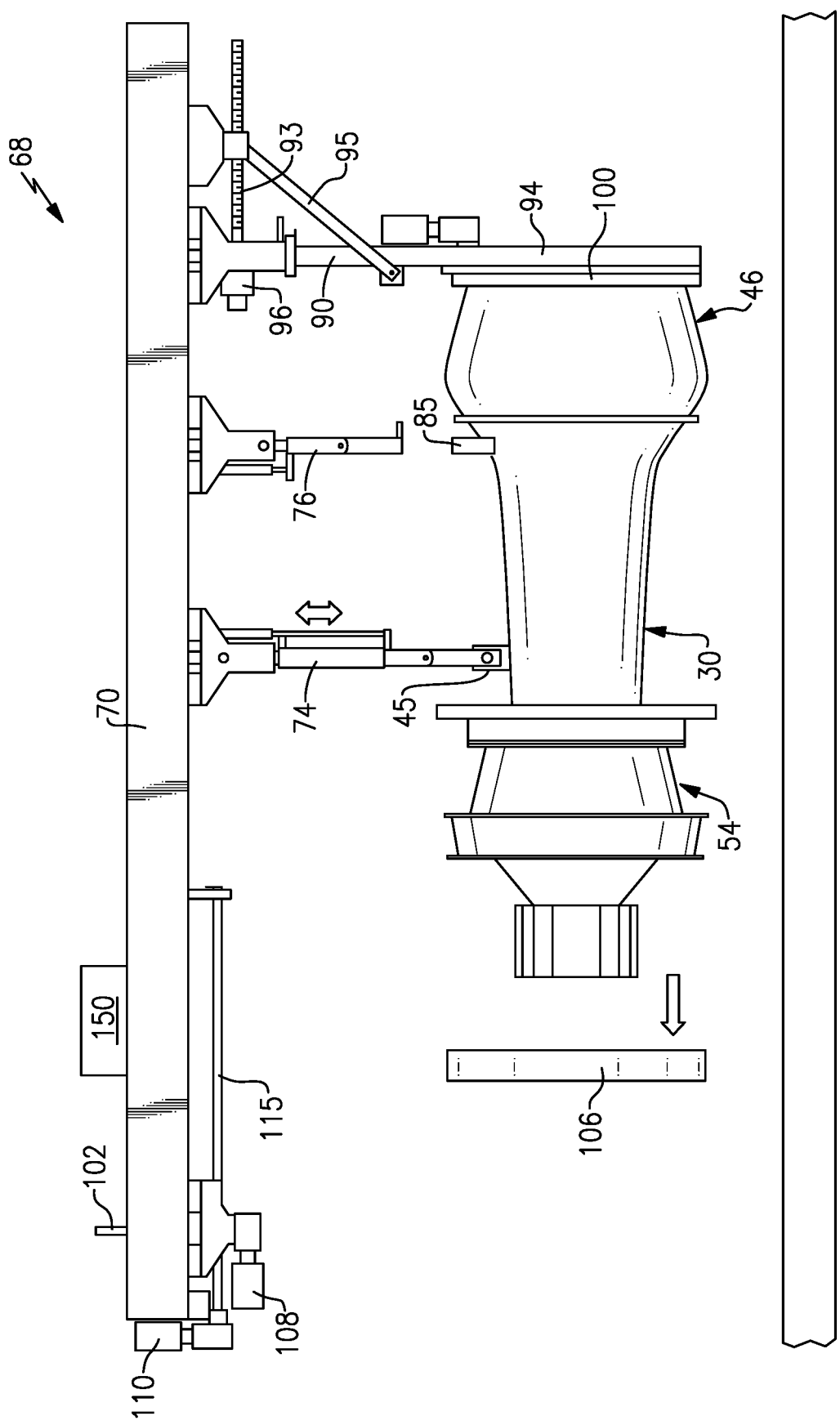
FIG. 14 is a schematic view of a preparation step for attaching a fan section.

Referring to FIGS. 10, and 12, once the FDC section 60 is attached to the core section 30, the forward arm 102 is engaged to the ring 106. The forward arm 102 supports the roller assembly 114. The roller assembly 114 is moved into position utilizing motor 110 that drives ball screw 115 to move the support 72 into horizontal position. Motor 108 is utilized to move the arm 102 vertically once the motor 110 has moved the arm 102 into a horizontal position. Rollers 112 of the roller assembly 114 are inserted into a groove 105 of the ring 106 to support the engine subassembly and rotation.

Figure 13:
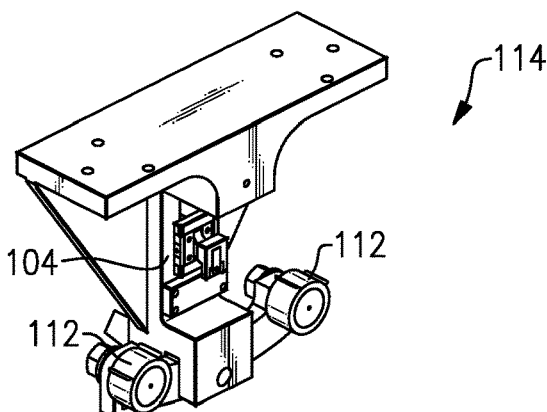
FIG. 13 is a perspective view of an example roller assembly.

Referring to FIG. 13, with continued attention to FIGS. 10 and 12, the roller assembly 114 includes two rollers 112 that are received within the groove 105 of the ring 106. The rollers 112 are spaced apart horizontally to provide stability in support of the engine subassembly. Sensors schematically indicated at 104 are provided to verify correct positioning of the roller assembly 114 within the groove 105 of the mount ring 106. The sensor 104 provides information to the controller 150 that is in communication and control over the actuators and various sensors of the assembly system 68.

Once the roller assembly 114 is engaged with the ring 106, the first and second arms 74, 76 can be disconnected from the core engine section 30. Once the first and second arms 74, 76 are disconnected the entire engine subassembly is supported between the forward arm 102 and the third arm 90. Accordingly, full 360 degree rotation around the horizontal axis of the engine subassembly is enabled. Rotation of the subassembly is provided by actuating the motor 92 to drive the gear assembly 138 to rotate the gear ring 94. The gear assembly 138 includes gear teeth that engage gear teeth defined on the gear ring 94.

Figure 15:
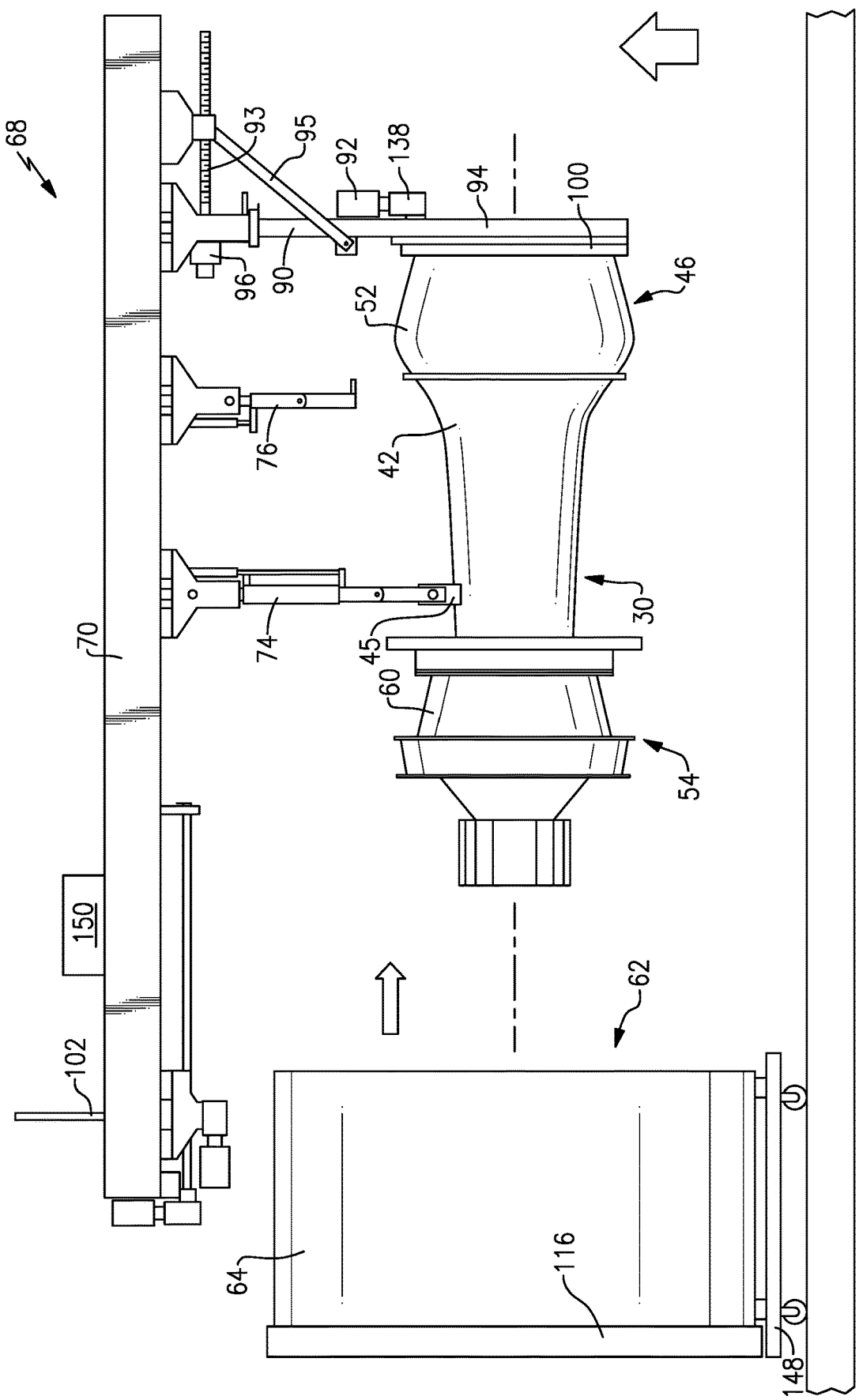
FIG. 15 is a schematic view of an initial assembly operation for attaching a fan case section to another engine subassembly.

Referring to FIG. 15, once assembly operations on the subassembly are complete including operations on the core section 30, LPT section 46 and FDC section 54 the subassembly is prepared for installation of the fan section 62. Installation of the fan section includes coupling to the 1-DC section 54 and attachment of sub components of the fan case 64 to the FDC case 60.

In preparation for assembly of the fan section, the first arm 74 is reattached to the core section 30. The first arm 74 is rigidly attached meaning that rotation is not possible. Accordingly, the subassembly is supported by the first arm 74 and by the aft arm 90. Once the subassembly is supported by the first arm, the arm 102 can be disconnected by removing the roller assembly 114 from the ring 106 and move the arm 102 forward and upward. Each of the arms 74 and 90 are raised to place the subassembly in a position that enables alignment with the fan case 64. The mount ring 106 is removed and subassembly is ready for assembly of the fan case section 62.

Figure 16:
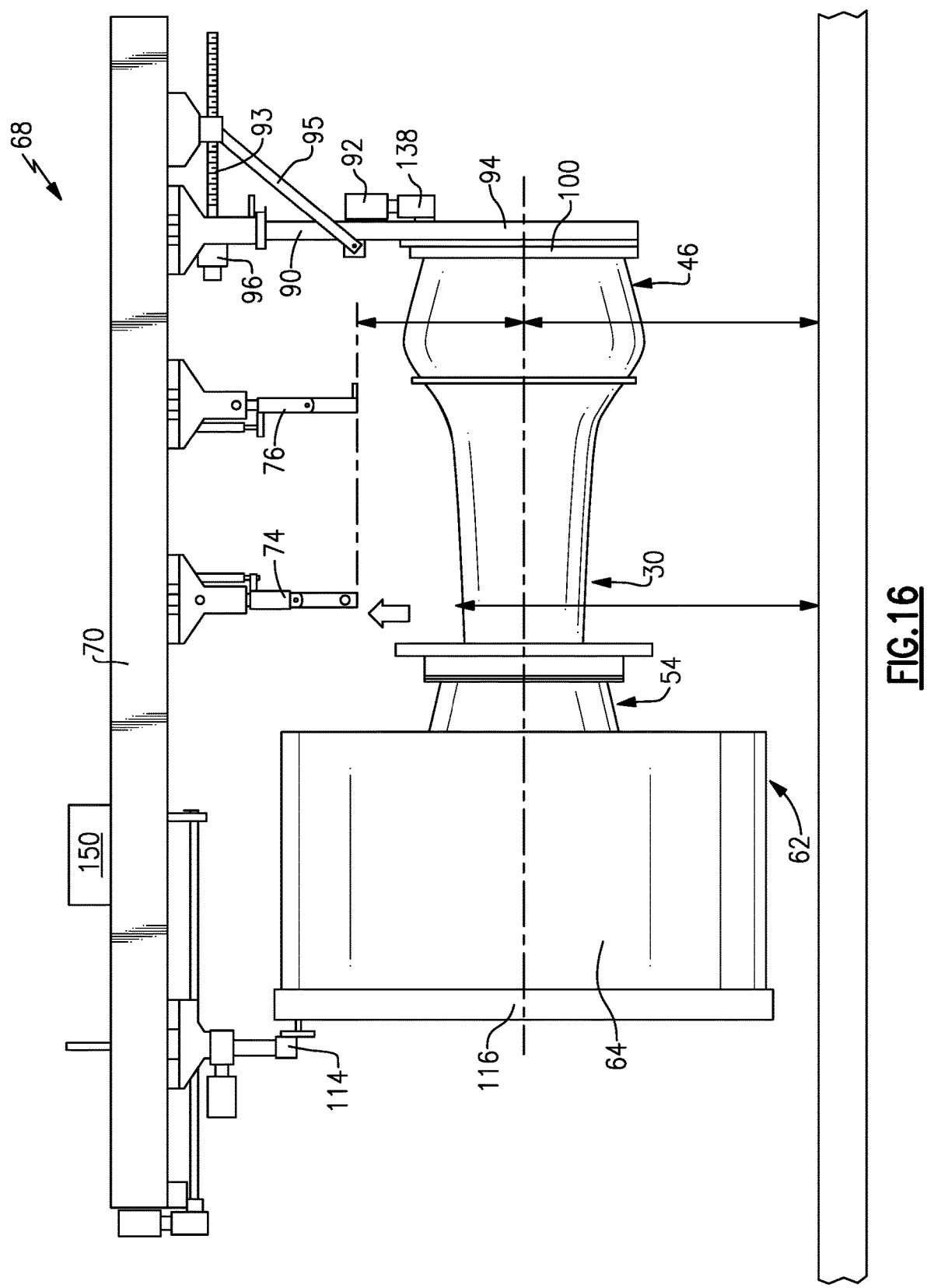
FIG. 16 is a schematic view of the engine subassembly supported by the assembly system.

Referring to FIGS. 15 and 16, the fan case 64 is moved along the horizontal axis into alignment with the FDC section 30 on cart 148. The cart 148 includes features that enable movement of the fan case 64 for alignment along the horizontal axis with the other subassembly components supported by arms extending from the upper beam 70. The fan case 64 includes a mounting ring 116 configured to receive the rollers 112 of the roller assembly 114.

Once the fan case 62 is attached to the FDC case 54, the roller assembly 114 is lowered into position and the rollers 112 (FIGS. 12 and 13) are inserted into grooves defined within the mounting ring 116. The mounting ring 116 includes a configuration similar to that of the mount ring 106, except that the mounting ring 116 is a size appropriate for the fan case 64 and features compatible with attachment to the fan case 64. The engine subassembly is therefore supported at the forward end by the roller assembly 114 and at the aft end by the gear assembly 138 and ring gear 94. In this supported condition, the engine subassembly may then be rotated around the horizontal axis a full 360 degrees to enable access to all portions of the outer engine assembly for mounting the accessory components to each of the outer case portions and surfaces.

Accordingly, the example assembly system enables efficient assembly operation in a reduced vertical space that simplifies access to components.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of assembling a gas turbine engine comprising:
    attaching an aft mounting ring to an aft portion of turbine section;
    attaching a forward mounting ring to a forward portion of a fan/compressor section;
    supporting a core engine section along a horizontal axis;
    attaching the turbine section to the core engine section;
    supporting a portion of the turbine section along a horizontal axis with a drive supported on an aft arm by attaching the aft mounting ring to the drive;
    supporting a portion of the fan/compressor section along the horizontal axis with a roller assembly supported on a forward arm by coupling the roller assembly to the forward mounting ring, wherein the forward mounting ring includes a circumferential groove for receiving rollers of the roller assembly and supporting the fan/compressor section includes inserting the rollers into the circumferential groove of the forward mounting ring;
    rotating the turbine section, core engine section and fan/compressor section about the horizontal axis with the drive supported on the aft arm; and
    performing assemble operations on the turbine section, core engine section and fan/compressor engine sections.

2. The method as recited in claim 1, wherein the drive comprises a motor driving a gear assembly and the aft mounting ring includes gear teeth engaged by the gear assembly for driving rotation of the turbine section about the horizontal axis.

3. The method as recited in claim 2, wherein supporting the core engine section along the horizontal axis includes fixing a first arm to a first mount attached to the core engine section and a second arm to a second mount attached to the core engine section.

4. The method as recited in claim 3, including detaching the first arm and the second arm from the corresponding first mount and second mount prior to rotating the turbine section, core engine section and fan/compressor section about the horizontal axis.

5. The method as recited in claim 1, including aligning the turbine section along the horizontal axis with a cart, wherein the cart enables positioning of the turbine section in at least two axes.

6. The method as recited in claim 1, including supporting an end assembly on an intermediate arm and making a lateral adjustment to align an engine component secured thereto in a direction transverse to a horizontal axis with a lateral adjustment linkage of the end assembly on the intermediate arm.

7. The method as recited in claim 6, including detaching the end assembly from the intermediate arm once the end assembly is attached to other engine components supported by one of the forward mounting ring and the aft mounting ring.

* * * * *